July 29, 1924.
K. H. CONLEY
1,503,116
POWER TRANSMISSION FOR ELECTRIC CURRENT GENERATORS
Filed Feb. 14, 1923
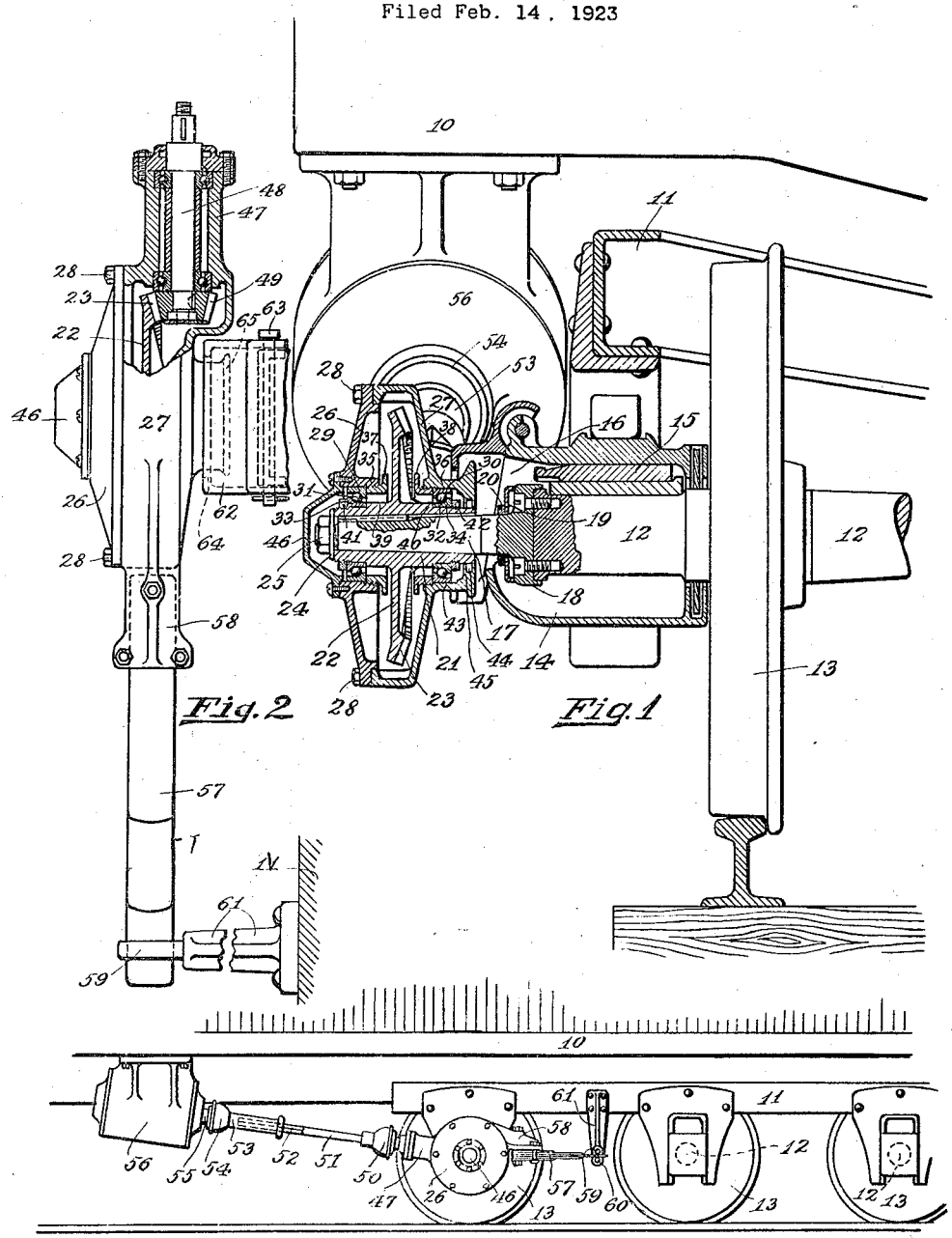
Inventor
Kurt H. Conley
By
Chamberlain & Newman    Attorneys Patented July 29, 1924.

1,503,116

UNITED STATES PATENT OFFICE.

KURT H. CONLEY, OF BRIDGEPORT, CONNECTICUT.

POWER TRANSMISSION FOR ELECTRIC-CURRENT GENERATORS.

Application filed February 14, 1923. Serial No. 618,895.

*To all whom it may concern:*

Be it known that KURT H. CONLEY, citizen of the United States, and resident of Bridgeport, in the county of Fairfield and State of Connecticut, has invented certain new and useful Improvements in Power Transmission for Electric-Current Generators, of which the following is a specification.

The present invention relates to improvements in power transmission for electric current generators, and particularly for use in connection with the lighting or other electrical equipment of railway cars or other wheeled vehicles. In railway practice it is acknowledged to be desirable to mount electric generators upon the body of the car rather than upon the truck which carries the wheel-axles, because when mounted upon the car body the generator is free from the shocks caused by hammering of rail-joints, or other unevenness of the track, or of the wheels themselves. Furthermore it has been found that the extra weight of the generator hung from one end of the truck has caused a very undesirable rocking or rebounding motion in the whole truck.

However the mounting of the generator upon the car body and driving same from the axle, has always been attended by considerable difficulty, because of the different positions assumed by the axles and truck relative to the car body, when the car is on a curved track. The axles also have considerable play in all directions horizontally relative to the truck frame, due to the loose fits between the axle journal box and their guides, which condition always occurs in railway practice.

An object of the invention, therefore, is to provide a transmission for a generator whereby the generator may be conveniently supported upon the car body in a manner to positively drive the generator, and without regard to the irregular movement between the wheel-axle and body to the generator. A further object is to provide a gear drive directly connected to the axle, and removed from the influence of the irregular movement of any other member.

Another object is to provide improved means for non-rotatably and resiliently connecting the transmission casing to the truck of the car, in a manner to avoid shock to the mechanism. A still further object is to provide in connection with the transmission an improved journal box cover adapted to permit convenient access to the box, for adjustment, inspection or repair, when desired, and without disturbing the transmission mechanism.

Other objects are to provide a simple, compact, durable and readily attachable and detachable transmission.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a vertical sectional view through the transmission, and adjacent parts of the car structure;

Fig. 2 is a plan view of the transmission casing, partly in horizontal section; and Fig. 3 is a side elevation of a portion of the car structure, showing the device in place thereon.

Similar reference characters indicate corresponding parts throughout the several figures of the drawings.

Referring to the drawings, 10 represents the car body, 11 the trunk and 12 the axles carrying wheels 13. A journal box 14 provided with a journal bearing 15, houses the projecting end of the axle in the usual manner. The journal box is provided with an opening 16 disposed in an inclined plane, and normally provided with a hinged cover, which is substituted in the present invention by a special form of cover, presently to be more fully referred to.

To the end of the axle there is bolted a flanged slightly tapered extension spindle 17, the bolt heads 18, being enclosed and protected by a cover 19, held in place by a collar 20. The extension spindle may be attachable as shown or may be formed as an integral part of the axle. It extends and protrudes through the opening 16 of the journal box, and has keyed thereon a bevel gear comprising an elongated hub 21, having a flange 22 substantially centrally thereof, and a toothed bevel gear ring 23 formed integral with the flange or it may be nonintegral and hot-riveted or otherwise suitably secured thereto. A washer 24 and lock nut 25 are provided on the end of the spindle to retain the gear against endwise movement.

A non-rotatable gear-casing is mounted upon the hub 21, and comprises two sections 26 and 27, bolted together as at 28; ball bearings being provided at each side of the flange 22, between the casing and the hub. These comprise outer races 29 and 30, anti-friction balls 31 and 32, and inner races 33 and 34, the outer races being mounted in the cylindrical portions 35 and 36 of the respective casing sections 26 and 27, and being held therein by screw rings 37 and 38. The inner races are mounted on the hub 21, being held in abutting relation with shoulders 39 and 40 formed thereon, by means of screw rings 41 and 42.

The casing is closed at its rear end by the contracted end portion 43 of the section 27, and a packing ring or gland 44 disposed in an annular groove 45 of the said portion 43, and engaging the hub 21. At the forward end a closure cap 46 is bolted to the section 26, and which may be conveniently removed to permit access to the nut 25, the removal of which permits endwise removal of the casing and gearing from the extension shaft 17.

The section 27 of the casing is provided with a cylindrical boss 47, in which there is journaled the shaft 48 of a bevel pinion 49 meshing with the bevel gear. The shaft 48 is connected by a universal ball joint 50 to one end of a shaft 51, the other end being square, as at 52, and connected by a slip joint connection with a member 53, which in turn is connected by a universal ball joint 54 to the armature 55 of the generator 56, secured to the car body 10.

The gear casing is prevented from rotating by a radial arm 57 comprising one, or a plurality of leaves as shown, of spring steel, one end being connected to a bracket 58 formed on the casing, and the other end extending slidably between a pair of retaining pins 59 and 60 of a bracket 61 provided on the truck. This construction is such as to allow a moderate motion under a spring-like restraint in both directions, and is adapted to absorb any shocks occasioned by sudden application of brakes, or reversal of the direction of motion from the axle spindle.

A cover 62 is disposed over the opening 16 of the journal box, being adapted to be slid into and out of place, and held in closed position by a pin 63. The front face of the cover is provided with a cut out portion 64 adapted to embrace the rear portion of the gear casing, which is provided with an upwardly and sidewise extending flange 65, engaging behind the cover in a manner to close the interior of the box against dirt, water or the like.

The transmission of motion from the spindle to the generator, through the universal and slip joint connection is adapted to compensate for different angular positions assumed by the truck relative to the car body. The construction permits of convenient access to the journal box, and to the transmission, and removal of the transmission from the axle, when desired.

While the invention is of particular advantage in transmitting power from an axle to a power-using unit on a car body, I also contemplate its use in connection with a power-using unit mounted on the truck itself; and also the use in certain instances of other gearing than the bevel type, and of other transmission than the universal and slip jointed shafting.

I have illustrated a preferred and satisfactory embodiment of the invention, but it is obvious that changes may be made therein within the spirit and scope thereof, as defined in the appended claims.

Having thus described my invention, what I claim and desire to secure by Letters Patent is:—

1. In combination with a wheeled vehicle including a body, an axle, and a truck carrying said axle, a power-using device mounted on the car body, an extension on said axle, an attachable and removable casing supported entirely on said extension, means to prevent rotation of said casing, gearing carried within said casing and adapted to be driven by said shaft extension, and transmission means connecting said gearing to said power-using device.

2. In combination with a wheeled vehicle including a body, an axle, and a truck carrying said axle, a power-using device mounted on the car body, an extension on said axle, an attachable and removable casing supported entirely on said extension, means to prevent rotation of said casing, gearing carried within said casing and adapted to be driven by said shaft extension, and transmission means connecting said gearing to said power-using device and including a shaft, universal joint connection means between said shaft and the gearing and power-using device, and a slip joint intermediate said universal joint connections.

3. In combination with a wheeled vehicle including a body, an axle, and a truck carrying said axle, a power-using device, gearing adapted to be rotated by said axle, a casing surrounding said gearing, transmission means connecting said gearing and said power-using device, and means for preventing rotation of said casing comprising a radial springy arm connected at one end to said casing, fixed retaining means on the truck slidably engaged by said arm at its other end and permitting flexing of said arm.

4. In combination with a wheeled vehicle including a body, an axle, and a truck carrying said axle, a power-using device, an extension on said axle, a gear having a hub keyed to said extension and removable longitudinally, removable means at the end of said extension adapted to retain said hub thereon, a casing surrounding said gear and having an opening adapted to expose said removable means, a removable cover adapted to normally close said opening, and transmission means connecting said gear to said power using means.

5. In combination with a wheeled vehicle including a body, an axle, and a truck carrying said axle, a power-using device, an extension on said axle, a gear including an elongated hub keyed to said extension and a central toothed flange, a casing comprising two sections connected together and separable in a plane of rotation of the extension, antifriction bearings between said casing and the gear hub comprising outer races removably mounted in said casing sections, inner races removably mounted on said hub at each side of said toothed flange, and antifriction balls between said outer and inner races, and transmission means connecting said gear to said power-using unit.

6. In combination with a wheeled vehicle including a body, an axle, and a truck carrying said axle, a journal box on said axle having an opening, an extension on said axle projecting outwardly from said opening of the journal box, a casing supported on said extension, gearing carried within said casing and adapted to be driven by said shaft extension, transmission means connecting said gearing to said power-using device, and a cover for the opening of said journal box having an opening embracing said casing and permitting removal of said cover independently of said casing.

7. In combination with a wheeled vehicle including a body, an axle, and a truck carrying said axle, a journal box on said axle having an opening, an extension on said axle projecting outwardly from said opening of the journal box, a casing supported on said extension, gearing carried within said casing and adapted to be driven by said shaft extension, transmission means connecting said gearing to said power-using device, a cover for the opening of said journal box having an opening embracing said casing and permitting removal of said cover independently of said casing, and a flange on said casing extending behind said cover in the closed position thereof, and adapted to co-operate with the cover to completely close said journal box.

Signed at Bridgeport in the county of Fairfield and State of Connecticut this 10th day of February A. D., 1923.

KURT H. CONLEY.

Witnesses:
C. M. NEWMAN,
DEBORAH J. CONLEY.